United States Patent
Albrecht et al.

(10) Patent No.: US 12,024,047 B2
(45) Date of Patent: Jul. 2, 2024

(54) METHOD FOR CONTROLLING CHARGING PROCESS OF ELECTRICAL ENERGY STORAGE DEVICE AND MATCHING TRANSFER OF ELECTRICAL ENERGY AND THERMAL ENERGY, AND CHARGING DEVICE

(71) Applicant: Volkswagen Aktiengesellschaft, Wolfsburg (DE)

(72) Inventors: Jan-Christoph Albrecht, Wolfsburg (DE); Jochen Westhaeuser, Braunschweig (DE); Frank Juergen Engler, Wolfsburg (DE); Carsten Wachsmuth, Schwuelper (DE); Arne-Christian Voigt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 79 days.

(21) Appl. No.: 17/181,637

(22) Filed: Feb. 22, 2021

(65) Prior Publication Data
US 2021/0265852 A1 Aug. 26, 2021

(30) Foreign Application Priority Data

Feb. 21, 2020 (DE) ...................... 10 2020 202 292.5
Apr. 14, 2020 (DE) ...................... 10 2020 204 694.8

(51) Int. Cl.
*B60L 53/66* (2019.01)
*B60L 53/16* (2019.01)
(Continued)

(52) U.S. Cl.
CPC ............... *B60L 53/66* (2019.02); *B60L 53/16* (2019.02); *B60L 53/18* (2019.02); *B60L 53/30* (2019.02);
(Continued)

(58) Field of Classification Search
CPC ............. H02J 7/007192; H02J 7/00034; H02J 7/00036; H02J 7/007194; H02J 7/00711;
(Continued)

(56) References Cited

U.S. PATENT DOCUMENTS

| 8,174,235 B2 | 5/2012 | Dyer et al. |
| 8,587,253 B2 | 11/2013 | Dyer et al. |

(Continued)

FOREIGN PATENT DOCUMENTS

| CN | 108032750 A | * 5/2018 | ............ B60L 53/302 |
| DE | 102012213855 A1 | 2/2014 | |

(Continued)

*Primary Examiner* — Richard Isla
*Assistant Examiner* — Manuel Hernandez
(74) *Attorney, Agent, or Firm* — Muncy, Geissler, Olds & Lowe, P.C.

(57) ABSTRACT

A method for controlling the charging process of an electrical energy storage device, at an electric charging device, wherein the charging device has a temperature control system and the energy storage device has a temperature control system, including at least the following steps: transfer of electrical energy between the charging device and the energy storage device, transfer of thermal energy between a temperature control system of the charging device and the temperature control system of the energy storage device, and transmission of at least one first item of information from a computing unit associated with the charging device to a computing unit associated with the energy storage device, and/or transmission of at least one second item of information from a computing unit associated with the energy storage device to a computing unit associated with the charging device.

17 Claims, 2 Drawing Sheets

| 10 | vehicle |
| 20 | charging device |
| 30 | thermal reservoir |
| 50 | coolant / coolant heat exchanger |
| 60 | heat exchanger |
| 70 | heat exchanger |
| 100 | refrigeration system |
| 130 | computing unit |
| 140 | computing unit |

(51) Int. Cl.
  *B60L 53/18* (2019.01)
  *B60L 53/30* (2019.01)
  *B60L 53/60* (2019.01)
  *H02J 7/00* (2006.01)
  *B60L 53/14* (2019.01)
  *F28F 27/00* (2006.01)

(52) U.S. Cl.
  CPC .......... *B60L 53/60* (2019.02); *H02J 7/00034* (2020.01); *H02J 7/00036* (2020.01); *H02J 7/00711* (2020.01); *H02J 7/007192* (2020.01); *H02J 7/007194* (2020.01); *B60L 53/14* (2019.02); *F28F 27/00* (2013.01); *H02J 2310/48* (2020.01)

(58) Field of Classification Search
  CPC ...... H02J 2310/48; B60L 53/66; B60L 53/16; B60L 53/18; B60L 53/30; B60L 53/60; B60L 53/14; F28F 27/00
  USPC .................................................. 320/107, 150
  See application file for complete search history.

(56) References Cited

U.S. PATENT DOCUMENTS

| | | | |
|---|---|---|---|
| 10,399,450 B2 * | 9/2019 | Miftakhov | B60L 53/305 |
| 10,589,631 B2 * | 3/2020 | Groß | B60L 53/305 |
| 10,717,367 B1 * | 7/2020 | Price | B60L 53/14 |
| 11,024,894 B2 * | 6/2021 | Terwilliger | H02J 7/007192 |
| 11,292,363 B2 | 4/2022 | Shimauchi et al. | |
| 11,515,586 B2 * | 11/2022 | Guerra | H01M 10/663 |
| 11,590,855 B2 * | 2/2023 | Wainwright | B60L 58/26 |
| 2010/0039069 A1 * | 2/2010 | Niwa | B60L 53/14 320/128 |
| 2012/0043935 A1 * | 2/2012 | Dyer | B60L 1/003 320/109 |
| 2013/0300361 A1 | 11/2013 | Origuchi et al. | |
| 2015/0054460 A1 * | 2/2015 | Epstein | B60L 58/27 320/109 |
| 2015/0306974 A1 * | 10/2015 | Mardall | H01M 10/625 429/120 |
| 2017/0088005 A1 * | 3/2017 | Christen | B60L 53/14 |
| 2017/0096073 A1 * | 4/2017 | Mardall | B60L 58/24 |
| 2017/0297431 A1 * | 10/2017 | Epstein | F02N 19/10 |
| 2019/0168593 A1 * | 6/2019 | Nakaso | B60L 58/24 |
| 2020/0338998 A1 * | 10/2020 | Wainwright | B60L 53/66 |
| 2020/0391603 A1 | 12/2020 | Ding et al. | |
| 2022/0396165 A1 * | 12/2022 | Almkvist | B60H 1/00328 |
| 2023/0294556 A1 * | 9/2023 | Lee | B60L 58/27 |

FOREIGN PATENT DOCUMENTS

| | | | |
|---|---|---|---|
| DE | 112012003109 T5 | 7/2014 | |
| DE | 102019102814 A1 | 8/2019 | |
| EP | 3636482 A1 * | 4/2020 | ............ B60L 53/302 |
| EP | 3890098 A1 * | 10/2021 | |
| WO | WO-2019043337 A1 * | 3/2019 | ............. B60L 53/16 |
| WO | WO2019162680 A1 | 8/2019 | |

\* cited by examiner

| 10 | vehicle |
|----|---------|
| 20 | charging device |
| 30 | thermal reservoir |
| 50 | coolant / coolant heat exchanger |
| 60 | heat exchanger |
| 70 | heat exchanger |
| 100 | refrigeration system |
| 130 | computing unit |
| 140 | computing unit |

METHOD FOR CONTROLLING CHARGING PROCESS OF ELECTRICAL ENERGY STORAGE DEVICE AND MATCHING TRANSFER OF ELECTRICAL ENERGY AND THERMAL ENERGY, AND CHARGING DEVICE

This nonprovisional application claims priority under 35 U.S.C. § 119(a) to German Patent Application No. 10 2020 202 292.5, which was filed in Germany on Feb. 21, 2020 and to German Patent Application No. 10 2020 204 694.8, which was filed in Germany on Apr. 14, 2020, and which are all herein incorporated by reference.

BACKGROUND OF THE INVENTION

Field of the Invention

The present invention relates to a method for controlling the charging process of an electrical energy storage device and to a charging device.

Description of the Background Art

Electrified vehicles have a battery to provide electrical energy for driving the vehicle. In most cases, this battery can be electrically charged through an external interface. Especially with fast charging processes, greater heating of the battery occurs in this process than when driving. This results in higher cooling requirements during the charging process than during travel. In the prior art, provision is made to meet these higher cooling requirements by the means that additional cooling capacity is provided by the charging device during the charging process.

In this context, the document DE 10 2012 213 855 A1 discloses a charging station and a battery arranged in a vehicle, wherein the vehicle can be connected to the charging station with a charging cable and a temperature control line. The charging station additionally includes a temperature control body.

Furthermore, the document DE 11 2012 003 109 T5, which corresponds to US 2012/0043943, discloses a method for charging an electric vehicle having an electric battery. The charging in this case includes the supply of a coolant to the electric vehicle in order to cool the electric battery during the charging process, especially for charging power levels between 100 and 300 kW.

SUMMARY OF THE INVENTION

It is therefore an object of the present invention to at least partially improve the known state of the art.

The method according to an exemplary embodiment of the invention is a method for controlling the charging process of an electrical energy storage device, at an electric charging device, wherein the charging device has a temperature control system and the energy storage device has a temperature control system, comprising at least the following steps: transfer of electrical energy between the charging device and the energy storage device, transfer of thermal energy between a temperature control system of the charging device and the temperature control system of the energy storage device, characterized by the steps: transmission of at least one first item of information from a computing unit associated with the charging device to a computing unit associated with the energy storage device, and/or transmission of at least one second item of information from a computing unit associated with the energy storage device to a computing unit associated with the charging device.

The transfer of the at least one first and/or second item of information takes place through, in particular, an electrical interface, by means of a PWM (pulse width modulation) signal, and/or an electrical interface, by means of a superimposed signal, and/or a radio interface, by means of a cloud and/or by means of a WLAN protocol and/or by means of a Bluetooth protocol.

The electrical interface in this case can be integrated into the second interface, which is used for the transfer of electrical energy.

Due to the transfer of the first and/or second items of information, the transfer of electrical and thermal energy can be matched especially well to the technical characteristics of the charging device and also of the energy storage device.

A charging process can be understood to mean that electrical energy is transferred between the charging device and the energy storage device. This includes the charging of the energy storage device by the charging device using electrical energy, for example from the power distribution network and/or a generator unit. However, it also includes the discharging of the energy storage device through the charging device, for example into the power distribution network and/or another energy storage device.

The electric charging device can be a battery charging point that can transfer electrical energy to an electrical energy storage device, in particular by means of a charging cable and a charging plug. This is compatible with most electrified vehicles at present. However, it can also be a charging station that can transfer energy by means of an induction plate to an induction plate electrically connected to an energy storage device. This has the advantage that the charging process can be carried out in a contactless manner, in particular without the necessity of plugging in a plug.

The charging device can obtain the electrical energy for charging the electrical energy storage device from the power distribution network. This results in great availability of electrical energy. In other embodiments, the charging device obtains the electrical energy for charging the electrical energy storage device from another electrical energy storage device, for example an electrical energy storage device arranged in the charging device. In some embodiments, provision is additionally made that the charging device obtains the electrical energy from a generator unit, which is to say, for example, from a fuel cell and/or an electric generator driven by an internal combustion engine. The latter embodiments have the advantage that they can be set up anywhere, independently of an electric power supply infrastructure.

The transfer of electrical energy between the charging device and the energy storage device is accomplished in the present case by means of an appropriate interface. This interface of the charging device for the transfer of electrical energy can be connected to an interface of an electrical energy storage device for the transfer of electrical energy. It is not strictly necessary for the connection to be direct in this case. An indirect connection is also possible. For example, the connectable interface can be the interface of an electrified vehicle that is electrically connected to the energy storage device to be charged. The only relevant factor is that the connectable interface is suitable for the transfer of electrical energy between the charging device and the electrical energy storage device. The transfer here can take place both conductively, which is to say, for example, by means of a cable and/or a busbar, and inductively. Preferably, a plug-in conductive connection is used as the interface, which is to say, for example, a socket into which it is possible to plug a cable with a connector, which in turn has an electrical connection to an energy storage device to be charged and/or can be brought into electrical connection with an energy storage device to be charged. Of course, a cable can also be permanently connected to the charging device. This cable then has, on the end not connected to the charging device, a plug that can be brought into electrical connection with an energy storage device to be charged. If the energy storage device of an electrified vehicle is involved, then the vehicle usually has a socket that is electrically connected to the energy storage device.

The transfer of thermal energy between the charging device and the energy storage device is likewise accomplished by means of an appropriate interface. This interface of the charging device for the transfer of thermal energy can likewise be connected to an interface of the energy storage device to be charged for the transfer of thermal energy. Here, too, it is not strictly necessary for the connection to be direct. The interface need only permit the transfer of thermal energy between the charging device and the energy storage device. In some embodiments the transfer of thermal energy is accomplished by means of a thermally conductive solid. Preferably, however, the transfer of thermal energy is accomplished by means of a fluid, especially preferably by means of a liquid, for example by means of a water-based coolant. In some embodiments, a fluid is used that is also used for temperature control of the energy storage device outside of the charging process. If this device is, for example, the traction battery of an electrified vehicle, which provides a temperature control system with a particular coolant for temperature control of the battery, then the same coolant can be used for transferring thermal energy between the charging device and the battery. This advantageously reduces the number of components needed for the transfer of thermal energy. Preferably, the transfer of thermal energy is also carried out by means of a heat exchanger. In this case a temperature-control medium, which is to say, for example, a cooling fluid, in particular liquid coolant, whose temperature is directly controlled by the charging device, and a temperature-control medium that directly controls the temperature of the electrical energy storage device are physically separated by a heat exchanger. As a result, the temperature-control media of the charging device and of the energy storage device can be selected independently of one another.

An electrical energy storage device should be understood in the present case to mean any device that is suitable for storing electrical energy. This can be, for example, a capacitor, and/or preferably a battery, especially preferably a lithium-ion battery. Furthermore, it preferably is a traction battery, which is to say a battery that provides the electrical energy for driving an electrified vehicle. It is especially preferred for this to be a battery with a rated voltage of at least 100, 200, or 400 volts. Such batteries have the advantage that they store electrical energy especially efficiently. The electrified vehicle in this case is a pure electric vehicle, in particular. It can also be a hybrid or a hydrogen-powered vehicle, however. Moreover, it preferably is a land vehicle, especially preferably a trackless land vehicle.

The charging device additionally has a temperature control system. It contains the components necessary for thermal management of the charging device. It serves the purpose of heat and/or fluid transfer, in particular under open- and/or closed-loop control, between a thermal interface of the charging device and other components. The other components are preferably heat exchangers to the outside air and/or to additional coolant and/or refrigerant circuits. The heat transfer in the temperature control system by preference is accomplished by means of a temperature-control medium, either in a temperature-control medium circuit or in multiple temperature-control medium circuits that interact by means of heat exchangers and/or valves.

The energy storage device likewise has a temperature control system. It likewise contains the components necessary for its thermal management. It serves the purpose of heat and/or fluid transfer, in particular under open- and/or closed-loop control, between a thermal interface to a charging device and other components. The additional components are preferably heat exchangers to the outside air and/or to additional coolant and/or refrigerant circuits. In particular, the additional components are additional components necessary for the thermal management of a vehicle, such as a refrigerant circuit, which in some embodiments is used simultaneously for temperature control of the passenger compartment. The heat transfer in the temperature control system by preference is accomplished by means of a temperature-control medium, preferably by means of a coolant, either in a temperature-control medium circuit or in multiple temperature-control medium circuits that interact by means of heat exchangers.

An open-loop and/or closed-loop control of the temperature control system of the charging device and/or of the temperature control system of the energy storage device preferably occurs here taking into account the efficiencies of the additional components of the temperature control system of the charging device and/or of the temperature control system of the energy storage device. For this purpose, an open-loop and/or closed-loop control system can additionally and/or exclusively influence, in particular perform open-loop and/or closed-loop control of, the charging power transferred through an interface for electrical energy transmission.

The heat exchangers to the outside air associated with the temperature control system of the charging device and/or the condensers of a refrigerant circuit associated with the charging device can be arranged above the charging device, in particular vertically and/or in a V-shape. This represents an especially space-saving embodiment.

If an additional heat exchanger is used for the heat transfer between the charging device and the energy storage device and if the temperature control system of the charging device and/or of the energy storage device additionally has a refrigerant circuit, then in some embodiments the refrigerant circuit is also integrated into the additional heat exchanger, so that an integrated heat exchanger with two coolant circuits and at least one refrigerant circuit is produced.

The components can be arranged at least partially underground. In this embodiment, the cooling medium can be routed directly through the ground, which has a beneficial effect on efficiency. In some of these embodiments, a heat pump is also used in combination with the heat exchanger in the ground.

Provision can be made that the first and/or second item of information indicates the presence of technical equipment for carrying out the method according to the invention. In particular, it is specified whether equipment necessary for the transfer of thermal energy is present. Preferably, the specific design thereof, for example a technical standard, is likewise specified. Especially preferably, a first and a second item of information are subsequently compared. If they do not match, for example if they do not comply with the same standard, then the method is not executed or is aborted. This ensures that the systems of the energy storage device and of the charging device are compatible, so that the method is carried out efficiently and without errors.

The first and/or second item of information can provide a technically permissible pressure level for a supply and/or return. As a result, the volume flow rate provided for cooling, which rate is dependent on the pressure level of the supply and/or return, can be optimized for the temperature control system of the energy storage device.

The second item of information can provide a target supply temperature. In additional embodiments, provision is made that the second item of information provides a target refrigerating capacity. These embodiments make it possible to adjust the thermal management of the charging device especially precisely to the cooling or heating requirements of the energy storage device.

The first item of information can provide a deliverable supply temperature. Furthermore, the first item of information can provide a deliverable refrigerating capacity. Consequently, a computing unit associated with the energy storage device obtains information about the cooling and/or heating capacity that can be delivered by the charging device, and can undertake control of the temperature control system of the energy storage device that is oriented thereto.

The first and/or second item of information furthermore can provide a current pressure drop in the temperature control system of the energy storage device and/or in the temperature control system of the charging device. Especially preferably, the first and/or second item of information provides technical characteristics of the cooling medium that is used for the transfer of thermal energy, such as thermal capacity and/or chemical composition and/or thermal stability. This permits especially efficient regulation of a cooling fluid transferred between the charging device and the energy storage device.

The first and/or second item of information can provide the estimated duration and/or the estimated end of a charging process. This permits an adjustment of the thermal energy transferred between the charging device and the energy storage device as a function of the progress of the charging process.

The invention further relates to a charging device for electrical energy storage devices, having: at least a first interface for the transfer of electrical energy, at least a second interface for the transfer of thermal energy, at least a third interface for the transfer of information according to the invention, and a computing unit, designed to carry out the method according to the invention.

In this context, the third interface can be designed as an additional electrical interface, through which the information can be transferred by means of a PWM signal, and/or as a first electrical interface, through which the information can be transferred by means of a superimposed signal, and/or as a radio interface, through which the information can be transferred by means of a cloud and/or by means of a WLAN protocol and/or by means of a Bluetooth protocol, and/or as an additional electrical interface, which is integrated into the first interface.

The computing unit can be, for example, a control unit arranged on or in the charging device. Preferably, however, it is a virtual, cloud-based computing unit that is in contact with the charging device through a radio or cable link.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
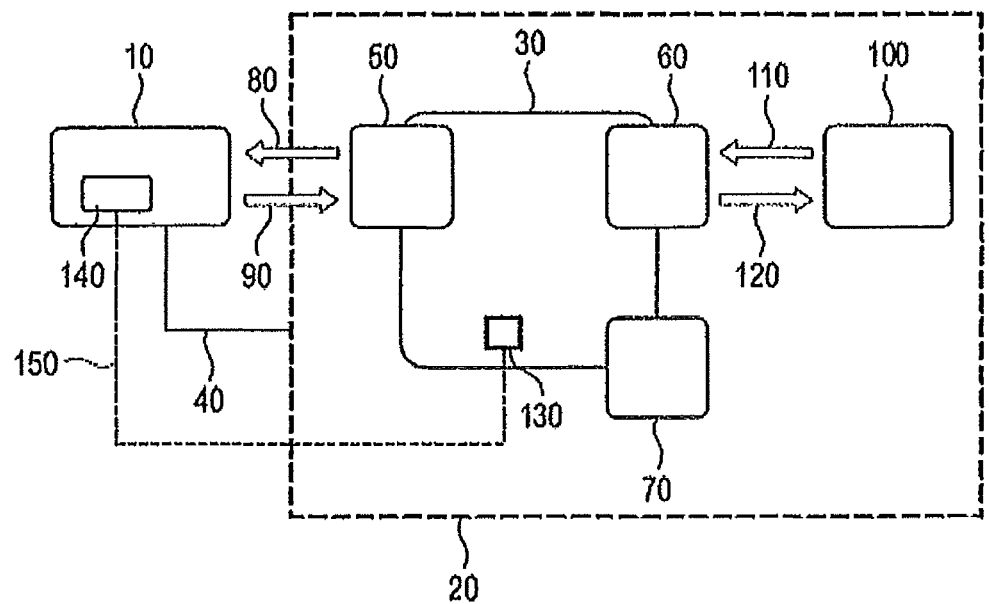
FIG. 1 shows an exemplary design of a charging device according to the invention.

FIG. 1 shows an exemplary design of a charging device 20 according to the invention. The charging device 20 is connected to a vehicle 10 through an electrical interface 40 and also through a thermal interface formed of coolant supply 80 and coolant return 90. In this design, thermal energy is transferred between the temperature control system of the battery charging point 20 and the temperature control system of the vehicle 10 by means of a coolant/coolant heat exchanger 50. Consequently, no exchange of coolant occurs between the temperature control systems. The coolant in use coming from the thermal interface 80, 90 corresponds here to the coolant used in the temperature control system of the vehicle 10.

The charging device 20 in this exemplary embodiment additionally includes a thermal reservoir 30. It is integrated in the temperature control system of the battery charging point 10. It can be cooled or heated prior to a charging process. Subsequently, the heating or cooling capacity thus stored can be used additionally during the charging process for temperature control of the energy storage device.

The temperature control system of the battery charging point 10 in this case includes a coolant/coolant heat exchanger 50, a coolant/refrigerant heat exchanger 60, and a coolant/air heat exchanger 70, as well as the additional hoses, pipes, control elements, and connecting elements required to connect them to one another, to the vehicle 10, and to the thermal reservoir 30. It is designed such that an exchange of thermal energy between all heat exchangers 50, 60, 70 is possible and can be adjusted in a targeted manner. The coolant/refrigerant heat exchanger 60 is designed for the transfer of thermal energy 110/120 with a refrigeration system 100, and can be used for temperature control of the thermal reservoir 30.

The charging device 20 additionally has a computing unit 130, which is designed to carry out the method according to the invention and to control the temperature control system. The sensors and actuators required for control are not shown here. The device furthermore has a data interface 150 to a computing unit 140 associated with the vehicle 10. This is preferably designed as a radio interface, such as a WLAN or mobile communications connection.

Figure 2:
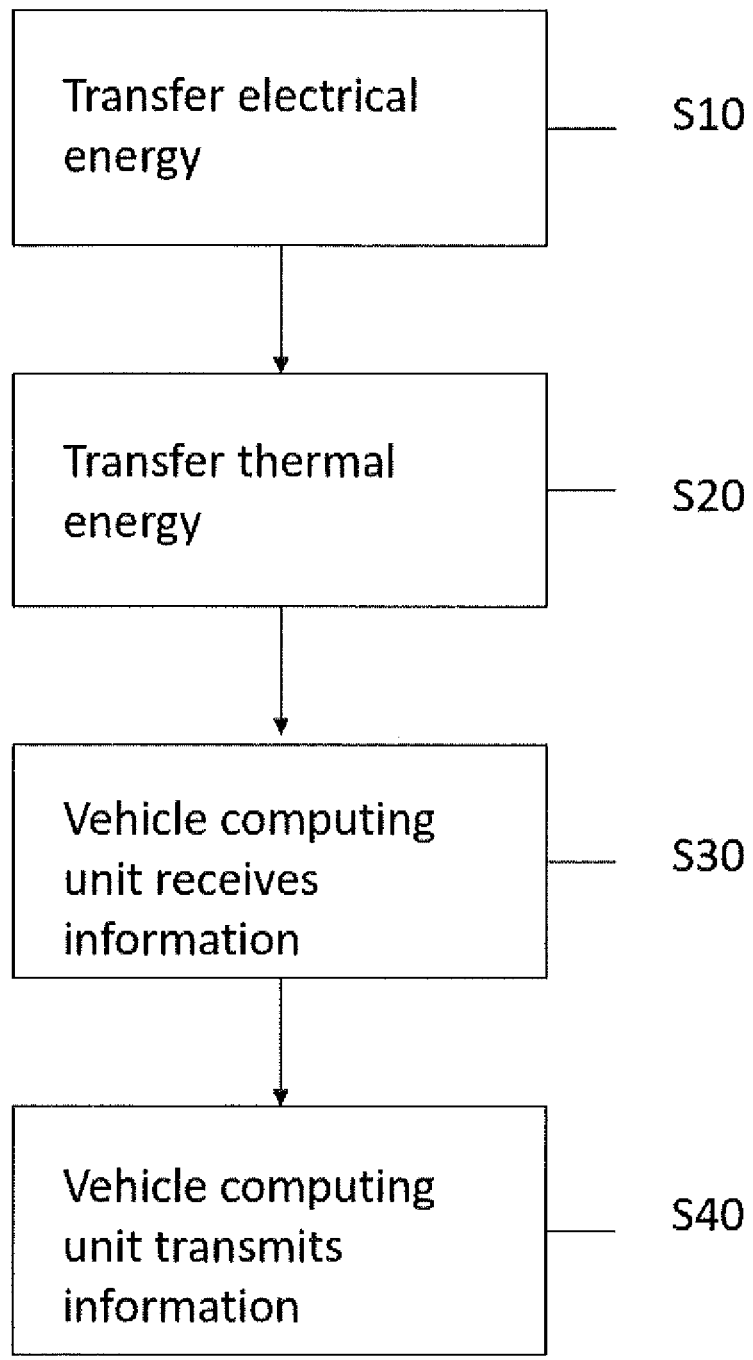
FIG. 2 shows an exemplary sequence of the method according to the invention.

FIG. 2 shows an exemplary sequence of the method according to the invention. In a first step S10, the transfer of electrical energy between a charging device and an energy storage device, which in this case is designed as a traction battery of an electrified vehicle, is begun. As a rule, this step takes place directly after an electrical interface of the charging device is connected to an electrical interface of the energy storage device. Preferably this is the case when a user inserts the charging plug of a charging cable connected to the charging device into the charging socket of his electrified vehicle. In a second method step S20, the transfer of thermal energy between a charging device and the energy storage device is begun as a result. This represents the preferred order of the method steps. In some implementations of the method, however, these method steps also take place simultaneously or in the reverse order. Furthermore, the sequence relates only to the start of the transfer processes. Of course, it is possible that electrical energy and thermal energy are transferred between the charging device and the energy storage device simultaneously. In another step S30, the computing unit 140 associated with the vehicle 10 receives information that includes the maximum cooling capacity deliverable by the charging device 20 from a computing unit 130 associated with the charging device 20 by means of a mobile communications connection 150. As a result, an optimization algorithm in the computing unit associated with the vehicle 10 determines an optimum supply temperature 80 for the remaining charging process S10 and, in method step S40, transmits this as the target supply temperature through the interface 150 to the computing unit 130 associated with the charging device 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a charging process of an electrical energy storage device, at an electric charging device, wherein the charging device has a temperature control system and the energy storage device has a temperature control system, the method comprising:
   transferring, through a first electrical interface, electrical energy between the charging device and the energy storage device;
   transferring, through a second interface, thermal energy between the temperature control system of the charging device and the temperature control system of the energy storage device; and
   transmitting, through a third electrical interface integrated in the first electrical interface, at least one first item of information from a computing unit in the charging device to a computing unit in the energy storage device, and/or transmitting at least one second item of information from the computing unit in the energy storage device to the computing unit in the charging device,
   wherein the first item of information and/or second item of information specifies whether technical equipment necessary for the transfer of thermal energy is present and a technical standard of the technical equipment, and
   wherein the at least one first item of information and/or second item of information is adapted to be transferred as a PWM signal or is adapted to be transferred by a superimposed signal.

2. The method according to claim 1, wherein the first and/or second item of information provides a technically permissible pressure level for a supply and/or return.

3. The method according to claim 1, wherein the second item of information provides a target supply temperature.

4. The method according to claim 1, wherein the first item of information provides a deliverable supply temperature.

5. The method according to claim 1, wherein the first and/or second item of information provides a current pressure drop in the temperature control system of the energy storage device and/or in the temperature control system of the charging device.

6. The method according to claim 1, wherein the second item of information provides a target refrigerating capacity.

7. The method according to claim 1, wherein the first item of information provides a deliverable refrigerating capacity.

8. The method according to claim 1, wherein the first and/or second item of information provides technical characteristics of the cooling medium that is used for the transfer of thermal energy.

9. The method according to claim 1, wherein the first and/or second item of information provides an estimated duration and/or an estimated end of the charging process.

10. A charging device for electrical energy storage devices, the charging device comprising:
    a computing unit associated with the charging device and configured to carry out the method according to claim 1;
    the first interface for the transfer of electrical energy;
    the second interface for the transfer of thermal energy; and
    the third interface for the transfer of information from the computing unit to a computing unit associated with the electrical energy storage device.

11. The method according to claim 1, wherein said transferring thermal energy between the temperature control system of the charging device and the temperature control system of the energy storage device is conducted by a heat exchanger.

12. The method according to claim 11, wherein a temperature control medium, whose temperature is directly controlled by the charging device, and a temperature control medium that directly controls the temperature of the electrical energy storage device are physically separated by the heat exchanger.

13. The method according to claim 1, wherein a temperature control medium of the charging device and a temperature control medium of the electrical energy storage device are selected independently.

14. The method according to claim 13, wherein the temperature control medium of the charging device and the temperature control medium of the electrical energy storage device are not exchanged between the temperature control system of the charging device and the temperature control system of the energy storage device.

15. The method according to claim 1, wherein the first item of information and the second item of information indicate a presence of technical equipment for carrying out the method and the technical standard of the technical equipment.

16. The method according to claim 15, further comprising comparing the technical standard of the first item of information and the technical standard of the second item of information,
    wherein if the technical standard of the first item of information and the technical standard of the second item of information do not comply with a same standard, the method is not executed.

17. The method according to claim 1, wherein the temperature control system of the charging device includes a coolant heat exchanger, a refrigerant heat exchanger and an air heat exchanger.

* * * * *